March 10, 1959
F. A. SCHULTZ
2,876,499
METHODS OF MOLDING PLASTIC MATERIAL AROUND FLEXIBLE INSERTS
Filed June 29, 1954
2 Sheets-Sheet 2
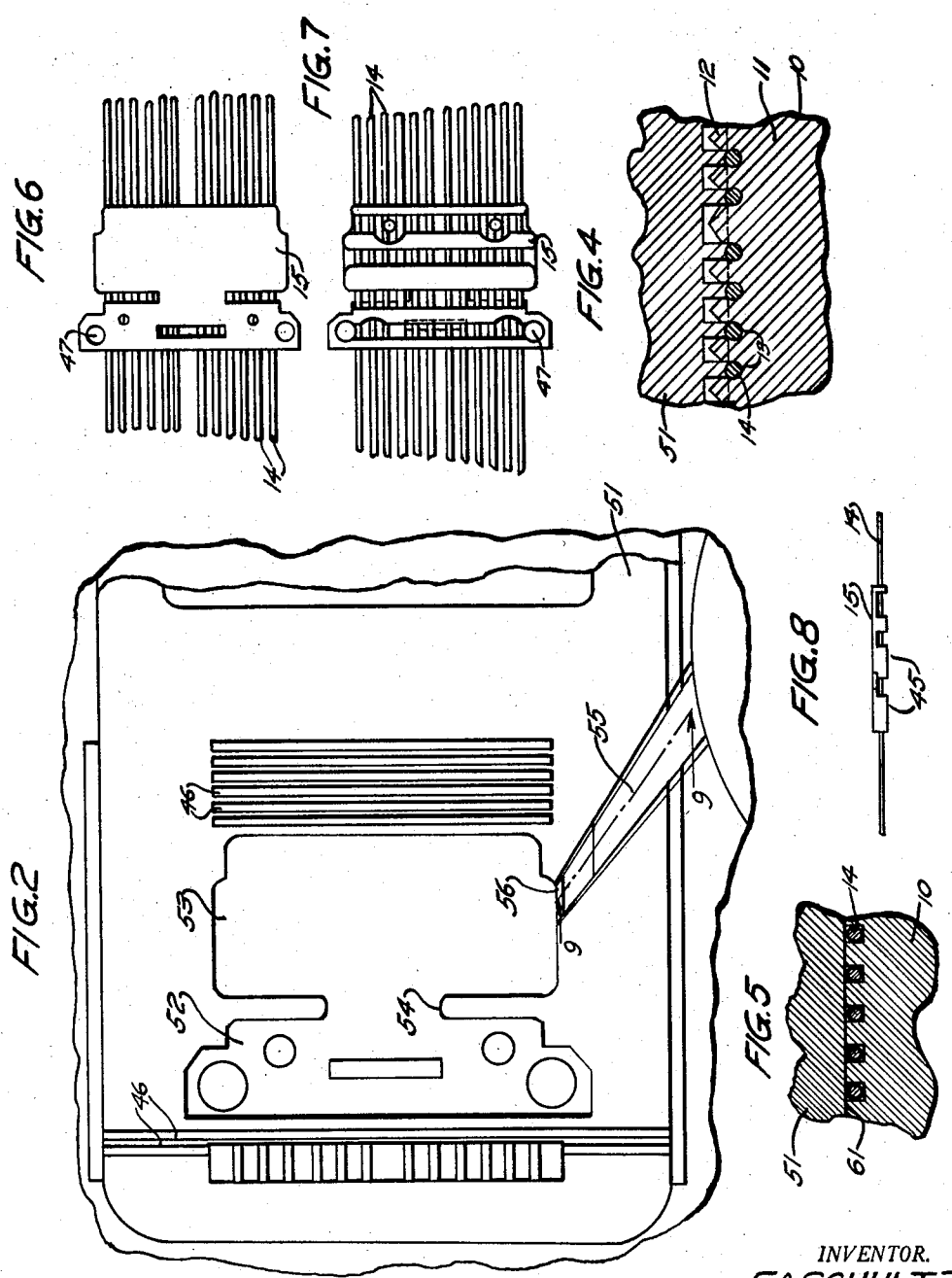
INVENTOR.
F.A. SCHULTZ
BY
C.B. Hamilton
ATTORNEY United States Patent Office 2,876,499
Patented Mar. 10, 1959

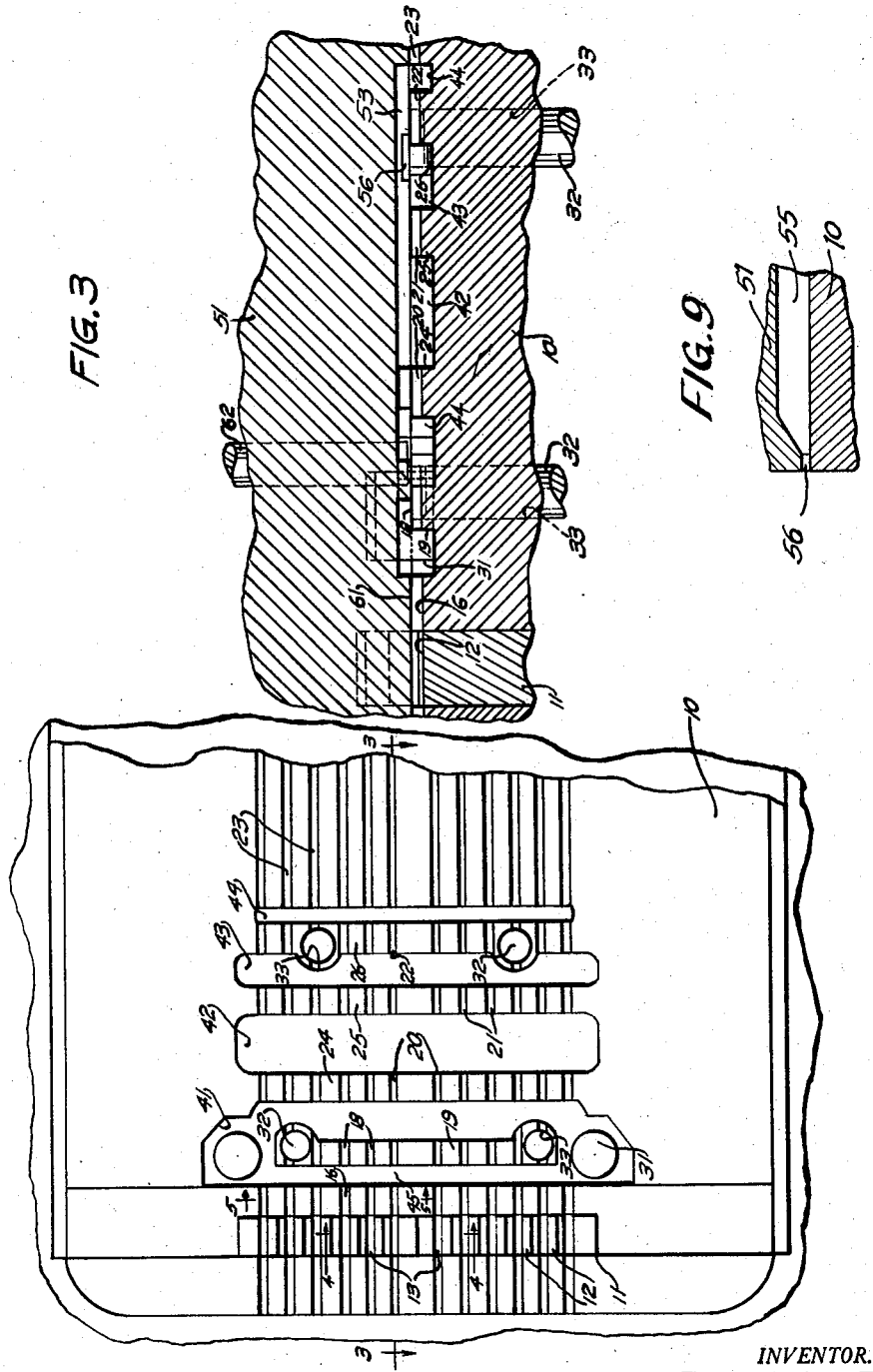

2,876,499

METHODS OF MOLDING PLASTIC MATERIAL AROUND FLEXIBLE INSERTS

Frank A. Schultz, La Grange, Ill., assignor to Western Electric Company, Incorporated, New York, N. Y., a corporation of New York Application June 29, 1954, Serial No. 440,060

4 Claims. (Cl. 18—59)

This invention relates to methods of molding plastic material around flexible inserts, and more particularly to methods of molding wire combs of wire spring relays.

In the manufacture of wire combs for wire spring relays, a block or mounting plate is molded under pressure around a plurality of parallel flexible wires. It is essential that the wires not be distorted by the molding operation thereon, and, in the past it has been very difficult to prevent bending and distorting the wires when the molding material is molded around the wires.

An object of the invention is to provide new and improved methods of molding plastic material around flexible inserts.

Another object of the invention is to provide new and improved methods of molding plastic blocks around a plurality of very flexible parallelly disposed wires.

A further object of the invention is to provide methods of molding thermosetting materials by transfer molding process around the plurality of very flexible parallelly disposed wires without deflecting the wires during the molding operation.

In a method illustrating certain features of the invention, plastic material is inserted into a molding cavity in a plane offset from a plurality of flexible inserts positioned in the molding cavity until the portion of the molding cavity on one side of the insert is filled, and then more plastic material is forced into the cavity to fill the cavity.

In a method forming more specific embodiments of the invention, a plurality of flexible wires are placed in parallel positions in a bottom section of a mold which includes a top section having a cavity which is unobstructed and a gate leading into the unobstructed cavity in a plane parallel to but offset from the parting line of the mold section. Thermosetting material under high pressure is forced through the gate to fill the portion of the cavity in the upper mold section initially, and then move downwardly between the wires into the portion of the molding cavity in the bottom mold section.

A complete understanding of the invention may be obtained from the following detailed description of a method forming specific embodiments thereof, when read in conjunction with the appended drawings, in which Fig. 1 is a fragmentary top plan view of a mold section of a molding apparatus for effecting a method forming one embodiment of the invention;

Fig. 2 is a fragmentary bottom plan view of a second molding section of a molding apparatus shown in Fig. 1;

Fig. 3 is a vertical section of both mold sections taken along line 3—3 of Fig. 1;

Fig. 4 is a vertical section of both mold sections taken along line 4—4 of Fig. 1;

Fig. 5 is a vertical section of both mold sections taken along line 5—5 of Fig. 1;

Fig. 6 is a fragmentary top plan view of an article made by the apparatus;

Fig. 7 is a fragmentary bottom plan view of the article shown in Fig. 6;

Fig. 8 is a side elevation of the article, and

Fig. 9 is a sectional view taken along line 9—9 of Fig. 2 showing a cross section of a portion of the molds and the passageway for the plastic material.

Referring now in detail to the drawings, there is shown in Fig. 1 a bottom mold section 10, which includes a wire-aligning comb 11 provided with teeth 12 having grooves 13 positioned therebetween for receiving flexible wires 14 to have a block 15 of a plastic compound molded therearound. The grooves are spaced so that wires placed therein are in close proximity to each other. A suitable compound is one containing phenol-formaldehyde as the essential ingredient thereof. The wires 14 are placed in parallel positions extending from the grooves 13 through grooves 16 aligned with grooves 18 and formed in a supporting core 19. The grooves 13 and 16 are aligned with grooves 20, 21, 22 and 23 formed in supporting cores 24, 25 and 26 and the right-hand side of the mold section 10, as viewed in Fig. 1, respectively. Core pins 31 project upwardly from the mold section 10 to form holes 47 in the final molding block, and knockout pins 32 slide in holes 33 in the mold section. The cores 24, 25 and 26 separate chambers 41, 42, 43 and a chamber 44 is provided to the right of the core 26. The chambers 41, 42, 43 and 44 are to be filled with the plastic compound to form bars 45 below the wires placed in the grooves 13, 16, 18, 20, 21 and 22. The depth of the grooves 16, 18, 21, 22 and 23 is equal to the diameter of the wires around which the thermosetting compound is to be molded. Transverse grooves 46 formed in a top mold section 51 (Fig. 2) provide clearance for debris to prevent breaking lands between the grooves 16 and 23.

The top mold section 51 designed to cooperate with the bottom mold section has chambers 52 and 53 which together match the outside composite boundaries of the chambers 41, 42, 43 and 44. The chambers 52 and 53 are connected by a channel 54, and when the thermosetting compound is forced by a transfer molding process through a runner 55 having an upwardly flared gate 56 opening into the upper chamber 53, the material which is plastic and at a temperature of about 300° F. flows into the chamber 53 and flows through the channel 54 into the upper chamber 52, and primarily fills the upper chambers 52 and 53 and the channel 54 before travelling into the lower chambers 41, 42, 43 and 44. Incoming plastic material does not immediately flow into the lower chambers 41, 42, 43 and 44 because of the close spacing of the wires 14 acting to oppose flow therebetween of the relatively low viscosity plastic. These closely spaced wires maintain the plastic in the upper chambers until such time as the upper chambers are completely filled and the pressure applied to the plastic is sufficient to force the plastic down through the small spaces between the wires. Further material coming in from the gate 56 creates sufficient pressure that the material is forced downwardly past the wires mounted in the grooves 16, 18, 20, 21, 22 and 23 to fill the chambers 41, 42, 43 and 44. Therefore, very little horizontal stress is placed on the wires during the molding operation, and they are not distorted or pushed out of parallel positions with one another. After the molding cavity formed by the chambers 41, 42, 43, 44, 52 and 53 is completely filled, the mold sections 10 and the die 51 are opened at a parting plane 61 thereof, and knockout pins 62 eject the molded block from the section 51. After the mold sections are widely separated, ejector pins 65 of knockout pins 32 and the wire-aligning comb 11 are moved upwardly relatively to the mold section 10 to lift the wires 14 and the block 15 molded therearound out of the mold half 10, after which the wires molded thereon are pulled to the right, as viewed in Fig. 3, to present new sections of the wires to have another block molded thereon. An apparatus suitable for using the mold described hereinabove is disclosed and claimed in copending application Serial No. 330,826, filed January 12, 1953, now Patent No. 2,794,211, by R. W. Brown-G. A. Mitchell-F. A. Schultz for "Apparatus for Molding Articles."

The above-described methods and apparatus serve to quickly mold plastic material around the wires to form a mounting block and does so without pressures on the wires, such as to cause them to be distorted out of parallel positions relative to one another.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. The method of molding a plastic supporting block about a plurality of flexible wires, which comprises supporting a plurality of flexible wires in a horizontal plane spaced from and parallel to the opposed top and bottom walls of a mold to form lower and upper cavities, spacing the wires in close proximity to each other to substantially preclude the free flow of plastic compound therebetween, and then forcibly flowing a plastic compound in a plane above and parallel to the plane of the wires into the upper cavity whereby the upper cavity fills with plastic and then the plastic is forced down between the wires into the lower cavity.

2. The method of molding plastic material around flexible inserts, which comprises supporting a plurality of flexible inserts in a mold cavity of a mold in a horizontal plane spaced from opposed top and bottom walls of the mold cavity in the mold to divide said mold cavity into upper and lower cavities and spaced in close proximity to each other to resist the free flow of plastic material, and forcing a plastic compound into the upper cavity in a direction parallel to the plane and above the plane to sequentially fill the upper cavity and then the lower cavity.

3. The method of molding a supporting block of plastic compound around a plurality of flexible wires, which comprises mounting a plurality of flexible wires in a horizontal plane and in parallel positions in close proximity to each other in a mold cavity and spaced from opposed top and bottom walls of the mold cavity to divide said mold cavity into upper and lower cavities whereby the close proximity of the wires resists the free flow of the plastic compound between said upper and lower cavities, and flowing a plastic compound under pressure into the upper cavity in a direction away from the plane of the wires to sequentially fill the upper cavity and then the lower cavity.

4. The method of molding plastic material around wires, which comprises supporting a plurality of flexible wires at spaced points therealong in a bottom mold section of a mold in a horizontal plane spaced from opposing top and bottom walls of a cavity formed in the mold to divide the mold cavity into upper and lower cavities, said wires being positioned in close proximity to each other to oppose the free flow of plastic material therebetween, and forcing a plastic material into the upper cavity above the plane of the wires and in a direction away from the plane to sequentially fill the upper portion of the cavity and then the lower portion of the cavity.

References Cited in the file of this patent

UNITED STATES PATENTS

| | | |
|---|---|---|
| 1,161,193 | Cook | Nov. 23, 1915 |
| 2,369,291 | Frank | Feb. 13, 1945 |
| 2,441,988 | Brillhart et al. | May 25, 1948 |
| 2,568,771 | Smith | Sept. 25, 1951 |
| 2,577,584 | Hofreiter | Dec. 4, 1951 |
| 2,677,855 | Mallory | May 11, 1954 |

OTHER REFERENCES

Chapuis, Ser. No. 391,198, published A. P. C., June 15, 1943, 18–IMP.